(12) United States Patent
Bryan et al.

(10) Patent No.: US 11,501,251 B2
(45) Date of Patent: *Nov. 15, 2022

(54) SYSTEM AND METHOD FOR DETERMINATION AND MANAGEMENT OF ROOT CAUSE FOR INVENTORY PROBLEMS

(71) Applicant: Walmart Apollo, LLC, Bentonville, AR (US)

(72) Inventors: Greg A. Bryan, Centerton, AR (US); Cristy C. Brooks, Cassville, MO (US); David Blair Brightwell, Bella Vista, AR (US); Benjamin D. Enssle, Bella Vista, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/245,277

(22) Filed: Apr. 30, 2021

(65) Prior Publication Data

US 2021/0264360 A1    Aug. 26, 2021

Related U.S. Application Data

(63) Continuation of application No. 15/918,032, filed on Mar. 12, 2018, now Pat. No. 10,997,552.

(Continued)

(51) Int. Cl.
*G06Q 10/08* (2012.01)
*G06Q 40/00* (2012.01)
*G06F 16/951* (2019.01)

(52) U.S. Cl.
CPC ....... *G06Q 10/0875* (2013.01); *G06F 16/951* (2019.01); *G06Q 40/12* (2013.12)

(58) Field of Classification Search
None
See application file for complete search history.

(56) References Cited

U.S. PATENT DOCUMENTS 5,392,382 A * 2/1995 Schoppers ............. G06N 5/003
                                                    700/250
5,544,282 A * 8/1996 Chen ..................... B25J 9/1666
                                                    700/255

(Continued)

FOREIGN PATENT DOCUMENTS

CA       2682886        4/2010
CN     204270352 U      4/2015

(Continued)

OTHER PUBLICATIONS

U.S. Appl. No. 15/914,763.

(Continued)

*Primary Examiner* — Fateh M Obaid
(74) *Attorney, Agent, or Firm* — Fitch, Even, Tabin & Flannery LLP (57) ABSTRACT

Scans of a selected product on shelves of a retail store are obtained and the scans are transmitted over a network via a transceiver circuit. A perpetual inventory (PI) value is stored for a selected product in a database. A data structure includes a first category and first actions programmatically linked to the first category. When the selected product is out-of-stock and when the PI value is greater than a predetermined threshold, one or more of the first actions associated with the first category are performed.

18 Claims, 4 Drawing Sheets

Related U.S. Application Data (60) Provisional application No. 62/471,446, filed on Mar. 15, 2017.

(56) References Cited

U.S. PATENT DOCUMENTS

| | | | |
|---|---|---|---|
| 5,963,919 A | 10/1999 | Brinkley | |
| 6,681,990 B2 | 1/2004 | Vogler | |
| 6,726,099 B2 | 4/2004 | Becker | |
| 6,758,403 B1 | 7/2004 | Keys | |
| 6,876,991 B1* | 4/2005 | Owen | G06N 20/00 |
| | | | 706/45 |
| 6,889,165 B2* | 5/2005 | Lind | G01D 21/02 |
| | | | 702/182 |
| 7,084,769 B2 | 8/2006 | Bauer | |
| 7,222,786 B2 | 5/2007 | Renz | |
| 7,370,005 B1 | 5/2008 | Ham | |
| 7,401,057 B2* | 7/2008 | Eder | G06N 5/022 |
| | | | 706/20 |
| 7,480,623 B1 | 1/2009 | Landvater | |
| 7,523,065 B2* | 4/2009 | Eder | G06Q 40/08 |
| | | | 705/38 |
| 7,552,066 B1 | 6/2009 | Landvater | |
| 7,580,848 B2* | 8/2009 | Eder | G06Q 10/06 |
| | | | 705/7.11 |
| 7,616,117 B2 | 11/2009 | Streeb | |
| 7,693,757 B2 | 4/2010 | Zimmerman | |
| 7,788,119 B2 | 8/2010 | Najmi | |
| 7,792,709 B1 | 9/2010 | Trandal | |
| 7,950,579 B2 | 5/2011 | Gray | |
| 7,954,712 B2 | 6/2011 | Babcock | |
| 8,091,782 B2 | 1/2012 | Cato | |
| 8,107,736 B2 | 1/2012 | Brown | |
| 8,189,855 B2 | 5/2012 | Opalach | |
| 8,191,672 B2 | 6/2012 | Kondo | |
| 8,195,533 B1 | 6/2012 | Mishra | |
| 8,224,717 B2 | 7/2012 | Giacobbe | |
| 8,260,456 B2 | 9/2012 | Siegel | |
| 8,321,302 B2 | 11/2012 | Bauer | |
| 8,321,303 B1 | 11/2012 | Krishnamurthy | |
| 8,346,630 B1 | 1/2013 | McKeown | |
| 8,423,431 B1 | 4/2013 | Rouaix | |
| 8,521,620 B2 | 8/2013 | Livingston | |
| 8,577,136 B1 | 11/2013 | Ascher | |
| 8,616,822 B2 | 12/2013 | Winkler | |
| 8,732,039 B1 | 5/2014 | Chen | |
| 8,965,796 B1 | 2/2015 | Gala | |
| 9,120,622 B1 | 9/2015 | Elazary | |
| 9,165,277 B2 | 10/2015 | Jones | |
| 9,171,278 B1 | 10/2015 | Kong | |
| 9,205,886 B1 | 12/2015 | Hickman | |
| 9,280,757 B2 | 3/2016 | Parpia | |
| 9,378,484 B1 | 6/2016 | Russell | |
| 9,415,935 B1 | 8/2016 | MacFarlane | |
| 9,758,301 B2 | 9/2017 | Porat | |
| 10,019,803 B2 | 7/2018 | Venable | |
| 10,089,055 B1 | 10/2018 | Fryman | |
| 10,130,177 B2 | 11/2018 | Jones | |
| 10,130,232 B2 | 11/2018 | Atchley | |
| 10,138,060 B1 | 11/2018 | Mantha | |
| 10,169,738 B2 | 1/2019 | Jones | |
| 10,189,642 B2 | 1/2019 | High | |
| 10,192,157 B2 | 1/2019 | Cote | |
| 10,289,990 B2 | 5/2019 | Rizzolo | |
| 10,311,400 B2 | 6/2019 | Mascorro Medina | |
| 10,360,548 B2 | 7/2019 | Brooks | |
| 10,373,116 B2 | 8/2019 | Medina | |
| 10,453,009 B2 | 10/2019 | Ulrich | |
| 10,467,587 B2 | 11/2019 | Bogolea | |
| 10,489,677 B2 | 11/2019 | Rzeszutek | |
| 10,505,057 B2 | 12/2019 | Haist | |
| 10,546,258 B2 | 1/2020 | Jones | |
| 10,552,792 B2 | 2/2020 | Mattingly | |
| 10,558,947 B2 | 2/2020 | Bryan | |
| 2001/0047293 A1 | 11/2001 | Waller | |
| 2002/0138336 A1 | 9/2002 | Bakes | |
| 2002/0174001 A1 | 11/2002 | Henry | |
| 2003/0216969 A1 | 11/2003 | Bauer | |
| 2003/0233277 A1 | 12/2003 | Saunders | |
| 2004/0158507 A1 | 8/2004 | Meek | |
| 2006/0157150 A1 | 7/2006 | Blakeslee | |
| 2006/0184511 A1* | 8/2006 | Koo | G06F 16/93 |
| 2007/0021864 A1 | 1/2007 | Mountz | |
| 2007/0144991 A1 | 6/2007 | Hansl | |
| 2007/0288439 A1* | 12/2007 | Rappaport | G06F 16/9535 |
| 2008/0077510 A1 | 3/2008 | Dielemans | |
| 2008/0114651 A1* | 5/2008 | Jain | G06Q 30/0226 |
| | | | 705/14.27 |
| 2008/0120205 A1 | 5/2008 | Hoopes | |
| 2008/0140491 A1* | 6/2008 | Jain | G06Q 30/0248 |
| | | | 705/14.47 |
| 2008/0255968 A1 | 10/2008 | Heinrichs | |
| 2008/0270269 A1 | 10/2008 | Myers | |
| 2008/0288595 A1* | 11/2008 | Liu | G06Q 10/10 |
| | | | 709/206 |
| 2009/0060349 A1 | 3/2009 | Linaker | |
| 2009/0063310 A1 | 3/2009 | Alonzo | |
| 2009/0101713 A1 | 4/2009 | Ulrich | |
| 2009/0157533 A1 | 6/2009 | Ohno | |
| 2010/0023459 A1* | 1/2010 | Sundby | G06Q 40/06 |
| | | | 705/36 R |
| 2010/0095269 A1* | 4/2010 | Bouillet | G06F 8/10 |
| | | | 717/104 |
| 2010/0106609 A1 | 4/2010 | Sherman | |
| 2010/0138037 A1 | 6/2010 | Adelberg | |
| 2011/0093418 A1* | 4/2011 | Kwok | G06N 3/006 |
| | | | 706/12 |
| 2011/0131557 A1* | 6/2011 | Bouillet | G06F 9/541 |
| | | | 717/138 |
| 2012/0209734 A1 | 8/2012 | Brooks | |
| 2012/0259655 A1 | 10/2012 | Madreperla | |
| 2012/0310781 A1 | 12/2012 | Battle | |
| 2013/0018696 A1 | 1/2013 | Meldrum | |
| 2013/0124189 A1* | 5/2013 | Baldwin | G06F 40/20 |
| | | | 704/235 |
| 2013/0211870 A1 | 8/2013 | Lawson | |
| 2014/0006131 A1 | 1/2014 | Causey | |
| 2014/0006229 A1 | 1/2014 | Birch | |
| 2014/0067634 A1* | 3/2014 | Sowder | G06Q 40/06 |
| | | | 705/35 |
| 2014/0100769 A1 | 4/2014 | Wurman | |
| 2014/0101088 A1* | 4/2014 | Hall | G06Q 10/101 |
| | | | 706/46 |
| 2014/0122391 A1* | 5/2014 | Mugan | G06N 7/005 |
| | | | 706/12 |
| 2014/0143039 A1 | 5/2014 | Branton | |
| 2014/0180865 A1 | 6/2014 | Argue | |
| 2014/0201042 A1 | 7/2014 | Meyer | |
| 2014/0247116 A1 | 9/2014 | Davidson | |
| 2014/0344118 A1 | 11/2014 | Parpia | |
| 2014/0379535 A1 | 12/2014 | Briet | |
| 2015/0039373 A1 | 2/2015 | Anand | |
| 2015/0154256 A1* | 6/2015 | McKenna | G06F 16/24542 |
| | | | 707/718 |
| 2015/0178654 A1 | 6/2015 | Glasgow | |
| 2015/0235157 A1 | 8/2015 | Avegliano | |
| 2015/0242805 A1 | 8/2015 | Sakurai | |
| 2015/0379366 A1 | 12/2015 | Nomura | |
| 2016/0042315 A1 | 2/2016 | Field-Darragh | |
| 2016/0114488 A1 | 4/2016 | Mascorro Medina | |
| 2016/0132823 A1 | 5/2016 | Swafford | |
| 2016/0132910 A1 | 5/2016 | Appel | |
| 2016/0171428 A1 | 6/2016 | Gooijer | |
| 2016/0371613 A1 | 12/2016 | Ulrich | |
| 2017/0148005 A1 | 5/2017 | Murn | |
| 2017/0155788 A1 | 6/2017 | Kobayashi | |
| 2017/0193430 A1 | 7/2017 | Barreira Avegliano | |
| 2017/0200106 A1 | 7/2017 | Jones | |
| 2017/0277863 A1* | 9/2017 | Subra | H04L 67/306 |
| 2017/0287038 A1* | 10/2017 | Krasadakis | G06Q 30/0201 |
| 2018/0005174 A1 | 1/2018 | Dixon | |
| 2018/0060804 A1 | 3/2018 | Cheruku | |
| 2018/0089613 A1 | 3/2018 | Chen | |

(56) References Cited

U.S. PATENT DOCUMENTS

| | | | | |
|---|---|---|---|---|
| 2018/0152884 | A1* | 5/2018 | Hu | H04W 8/18 |
| 2018/0268355 | A1 | 9/2018 | Bryan | |
| 2018/0268356 | A1 | 9/2018 | Bryan | |
| 2018/0268364 | A1 | 9/2018 | Bryan | |
| 2018/0268366 | A1 | 9/2018 | Bryan | |
| 2018/0268367 | A1 | 9/2018 | Bryan | |
| 2018/0268509 | A1 | 9/2018 | Bryan | |
| 2018/0341906 | A1 | 11/2018 | Bryan | |
| 2019/0057449 | A1* | 2/2019 | Berd | G06Q 40/04 |
| 2019/0073775 | A1 | 3/2019 | Lam | |
| 2019/0149725 | A1 | 5/2019 | Adato | |
| 2019/0156821 | A1* | 5/2019 | Zamora Duran | G06F 40/30 |
| 2019/0215424 | A1 | 7/2019 | Adato | |
| 2019/0291954 | A1 | 9/2019 | Lee | |
| 2019/0303863 | A1 | 10/2019 | Ghosh | |

FOREIGN PATENT DOCUMENTS

| | | |
|---|---|---|
| EP | 1901215 | 3/2008 |
| WO | 2015184286 | 12/2015 |
| WO | 2016109251 | 7/2016 |

OTHER PUBLICATIONS

U.S. Appl. No. 15/906,396.
U.S. Appl. No. 15/975,233.
U.S. Appl. No. 15/915,410.
U.S. Appl. No. 15/918,436.
U.S. Appl. No. 17/111,722.
U.S. Appl. No. 17/341,549.
U.S. Appl. No. 16/925,041.
U.S. Appl. No. 16/932,284.
U.S. Appl. No. 17/199,619.
U.S. Appl. No. 17/090,231.
"Improve Productivity and Customer Service in the Retail Store With Automated Inventory Management: The MC2100 in retail"; Zebra Technologies; Apr. 2015; pp. 1-6.
"Shelf Monitor"; Tech Mahindra; https://www.techmahindra.com/industries/Enterprise/retail_and_cpg/retail/solutions/shelf_monitor.aspx; 2016; pp. 1-1.
Angell, Robert C., "Control of State-Wide Liquor Inventories", National Association of Cost Accountants; NACA Bulletin (pre-1986); Feb. 15, 1948; pp. 1-9.
Bourzac, Katherine; "A Robot Takes Stock"; https://www.technologyreview.com/s/428374/arobottakesstock/; Published Jun. 29, 2012; pp. 1-4.
Fraunhofer; "The flying inventory assistant"; http://www.fraunhofer.de/en/press/research-news/2014/december/the-flying-inventoryassistant.html; Published Dec. 1, 2014; pp. 1-3.
Gruen, Thomas W., et al.; "A Comprehensive Guide to Retail Out-of-Stock Reduction in the Fast-Moving Consumer Goods Industry"; 2007; 71 pgs.
Kang, Yun, et al.; "Information Inaccuracy in Inventory Systems—Stock Loss and Stockout"; Massachusetts Institute of Technology; Published Aug. 23, 2004; 29 pages.
Lowe's Home Improvement; "Lowe's Introduces LoweBot"; https://www.youtube.com/watch? v=hP3yfGHTXFo; Published on Aug. 30, 2016; pp. 1-10.
McClain, John O; Cornell University; "Simulating Inventory Control with Orders that Cross during Lead Time"; http://www.exinfm.com/excel%20files/Inventory_Simulation.xls; Mar. 22, 2002; pp. 1-60.
Moyer, Ted; TotalRetail; "5 Steps to Solving the Out-of-Stock Problem"; http://www.mytotalretail.com/article/5stepstosolvingtheoutofstockproblem/; Published Apr. 19, 2016; pp. 1-7.
SAP; "How to Set Up and Manage a Perpetual Inventory System"; SAP; Jun. 22, 2016; pp. 1-108.
Stuart, Sophia; "Meet Tally, the Robot That Knows What's on Store Shelves"; http://in.pcmag.com/roboticsautomation/99587/news/meettallytherobotthatknowswhatsonstoreshelves; Published Jan. 27, 2016; pp. 1-8.
Trujillo, Paul; "Walmart is Addressing Inventory Problems With a New System"; http://www.waspbarcode.com/buzz/walmart-2/; Nov. 15, 2016; pp. 1-7.
Vanian, Jonathan; "Target's New Robot Helper Is Busy at Work on Aisle 3"; http://fortune.com/2016/04/28/targettestingrobotinventorysimbe/; Published Apr. 28, 2016; pp. 1-8.
Wharton School; "Robot Assistants in Aisle 10: Will Shoppers Buy It?"; http://knowledge.wharton.upenn.edu/article/robots-aisle-10-will-shoppers-like/; Published Sep. 7, 2016; pp. 1-5.

* cited by examiner

| CATEGORY 1 (402) | (404)<br><br>— INSTRUCT AUTONOMOUS VEHICLE TO FIND PRODUCT<br>— INSTRUCT EMPLOYEE TO FIND PRODUCT<br>— ADJUST PI VALUE |
|---|---|
| CATEGORY 2 (406) | (408)<br><br>— SEND INSTRUCTIONS TO EMPLOYEE |
| CATEGORY 3 (410) | (412)<br><br>— TRANSMIT ALERT TO EMPLOYEE<br>— REPLACE PRODUCT<br>— SEND MESSAGE TO TAKE NO FURTHER ACTION | ent
SYSTEM AND METHOD FOR DETERMINATION AND MANAGEMENT OF ROOT CAUSE FOR INVENTORY PROBLEMS

CROSS-REFERENCE TO RELATED APPLICATION

This application is a continuation of U.S. application Ser. No. 15/918,032 filed Mar. 12, 2018, which claims the benefit of the following U.S. Provisional Application No. 62/471,446 filed Mar. 15, 2017, both of which are incorporated herein by reference in their entireties.

TECHNICAL FIELD

This invention relates generally to the management of perpetual inventory values, and more particularly, to determining the root cause of perpetual inventory problems.

BACKGROUND

Stores utilize various measures to keep track of and manage products. One such measure is the perpetual inventory (PI) value associated with a product. In aspects, the PI value represents the quantity of product in the store. The PI value typically changes over time so as to accurately reflect the number of actual products in the store. For instance, products are purchased by customers and removed from the store affecting the PI value. Shipments arrive at the store and include additional products also affecting the PI value.

Stores also utilize other measures that relate to the value and availability of products for accounting and other purposes. For example, a book value of a product may be the value of all of the product present in the retail store.

Sometimes the PI value does not accurately reflect the correct number of products in the store. This can happen for a variety of reasons including mis-scanning products as the products leave or depart the store, or other forms of human error. If the PI value is incorrect, then various problems can develop. For instance, shipments can be ordered at the wrong times and for the wrong quantity of products.

BRIEF DESCRIPTION OF THE DRAWINGS

Disclosed herein are embodiments of systems, apparatuses and methods pertaining to determining root causes for out-of-stock items. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, systems, apparatuses and methods are provided that adjust perpetual inventory values and otherwise identify and/or take actions regarding inventory issues at retail stores (e.g., out-of-stock items). Advantageously, the shelves of a retail store are scanned to determine if an item is out-of-stock. The PI value of the product is compared to a predetermined threshold (e.g., 1). When the PI is greater than the threshold (i.e., the store believes there is available product), then the product is either located or the PI is adjusted.

In many of these embodiments, a system is configured to determine and manage inventory values of out-of-stock products in a retail store. The system includes a network, a sensor, a transceiver circuit, a database, and a control circuit.

The sensor is disposed in proximity to shelves at a retail store and is configured to obtain scans of a selected product on the shelves. The transceiver circuit is coupled to the sensor and the network, is disposed at the retail store, and is configured to transmit the scans from the sensor over the network.

The database is configured to store a perpetual inventory (PI) value for a selected product. The database is further configured to store a data structure and the data structure includes a first category and first actions that are programmatically linked to the first category. The first actions may be instructing an autonomous vehicle to find the selected product, instructing an employee to find the selected product, or adjusting the PI value of the selected product. Other examples are possible. The database is disposed at a centralized processing center and not at the retail store.

The control circuit is coupled to the network and the database, and is disposed at the centralized processing center. The control circuit configured to retrieve the PI value for the selected product from the database, and receive the scans from the transceiver circuit via the network. The control circuit is further configured to determine when the selected product is out-of-stock based upon an analysis of the scans. When the selected product is out-of-stock and when the PI value is greater than a predetermined threshold, the control circuit is configured to perform one or more of the first actions associated with the first category.

The predetermined value can take on a range of values. In one example, the predetermined value is 1. In aspects, the PI value is changed to an amount of the selected product found by the employee or the autonomous vehicle.

In other examples, the data structure includes a second category and a second action is programmatically linked to the second category. The second action includes sending instructions to a store employee to take no further action. The control circuit is further configured to obtain a last PI change time from the retail store. The last PI change time is the last time the PI value was changed at the retail store. The control circuit is configured to determine a time difference between a current time and the last PI change time. When the time difference is less than a predetermined time period, the control circuit is configured to perform the second action associated with the second category. In aspects, the predetermined time period is 7 days.

In yet other examples, the data structure includes a third category and third actions are programmatically linked to the third category. The third actions include transmitting an alert to a store employee to find another product to replace the selected product, and sending instructions to the store employee to take no further action. The database is further configured to store a recall list of product numbers that relate to products under a product recall. The control circuit is also configured to, from the scans, obtain an item number of the selected product and to compare the item number of the selected product to product numbers on the recall list. When the item number of the selected product is on the recall list, the control circuit is configured to perform one of the third actions associated with the third category.

In aspects, the control circuit is configured to convert the data structure into a report. For example, the control circuit renders the report to a store employee.

In others of these embodiments, scans of a selected product on shelves of a retail store are obtained and the scans are transmitted over a network via a transceiver circuit. A perpetual inventory (PI) value is stored for a selected product in a database. A data structure is stored in the database. The data structure includes a first category and first actions programmatically linked to the first category. The first actions include instructing an autonomous vehicle to find the selected product, instructing an employee to find the selected product, and adjusting the PI value of the selected product.

The PI value for the selected product from the database. The scans are received from the network and a determination is made as to when the selected product is out-of-stock based upon an analysis of the scans. When the selected product is out-of-stock and when the PI value is greater than a predetermined threshold, one or more of the first actions associated with the first category are performed.

In still others of these embodiments, a system is configured to determine and manage inventory values of out-of-stock products in a retail store. The system includes a network, a product display unit that is disposed at a retail store, a sensor, an autonomous vehicle, a transceiver circuit, a database, and a control circuit.

The sensor is disposed in proximity to the product display unit at the retail store and is configured to obtain scans of a selected product at the product display unit. The autonomous vehicle disposed at the retail store.

The transceiver circuit is coupled to the sensor, the autonomous vehicle, and the network. The transceiver circuit is disposed at the retail store, and is configured to transmit the scans from the sensor over the network.

The database is configured to store a perpetual inventory (PI) value for a selected product. The database is further configured to store a data structure. The data structure includes a first category and first actions that are programmatically linked to the first category. The first actions include instructing the autonomous vehicle to find the selected product, instructing an employee to find the selected product, and adjusting the PI value of the selected product. The database is disposed at a centralized processing center and not at the retail store.

The control circuit is coupled to the network and is disposed at the centralized processing center. The control circuit configured to retrieve the PI value for the selected product from the database and receive the scans from the transceiver circuit via the network. The control circuit is further configured to determine when the selected product is out-of-stock based upon an analysis of the scans. The control circuit is further configured to, when the selected product is out-of-stock and when the PI value is greater than a predetermined threshold, perform one or more of the first actions associated with the first category according to the data structure and/or according to actions performed with respect to the PI of the selected product at other retail stores.

Figure 1:
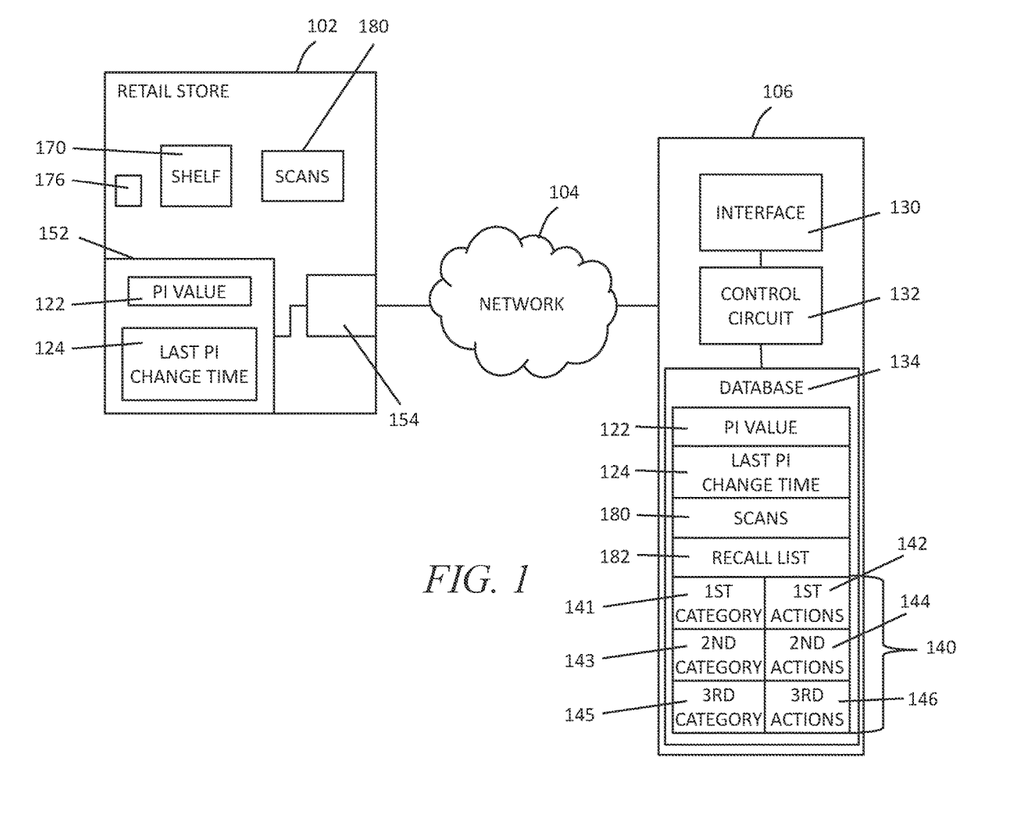
FIG. 1 is a block diagram showing one example of a system for determining root causes for out-of-stock items in accordance with some embodiments.

Referring now to FIG. 1, one example of a system 100 for adjusting the PI value of a selected product in a retail store 102 is described. The retail store 102 may be any type of retail store, for example, a discount center, a grocery store, a department store, or a hardware store to mention a few examples.

The retail store 102 includes a database 152 that stores for each product a PI value 122. The PI value 122 for the selected product indicates the amount of a selected product in the retail store.

A communication device or transceiver circuit 154 allows the retail store 102 to communicate with devices and entities that are external to the store. The communication device 154 may include any combination of hardware or software that allows communications to be received at the retail store 102, and makes transmissions from the retail store 102. The communication device 154 may be deployed within or at another device (e.g., a modem, a smart phone, or a personal computer, to mention a few examples).

Cloud network 104 is coupled to the communication device 154 (e.g., a transceiver circuit) at the retail store 102. The cloud network 104 may be any type of computer or communication network and may include routers, gateways, and servers to mention a few examples of devices that can form or be utilized in the network 104. The cloud network 104 may also be combinations of various types of networks.

A scanner or sensor 176 obtains scans 180 of a shelf 170. The scanner 176 may be any type of sensing device such as a camera that obtains visual images or an RFID sensor that senses RFID tags coupled to a product. The shelf 170 may be a customer shelf (accessible to a customer) or a top shelf (not accessible to a customer). The scans 180 can be of any format and, in one example, are visual images.

The apparatus 106 includes an interface 130, a control circuit 132, and a database 134. The interface 130 is configured to receive from the retail store 102 the perpetual inventory (PI) value 122 associated with the selected product. The database 134 stores the PI value 122. The apparatus 106 may be deployed at a central processing center such as the home office of the retail store.

In aspects, the apparatus 106 may be disposed at a central processing center or location such as a business headquarters. In other examples, the apparatus 106 is disposed at one or more remote locations (e.g., retail stores). Advantageously, disposing the apparatus at a central processing center reduces data storage cost, since all data can be stored at a single location instead of at multiple locations.

The database 134 is further configured to store a data structure 140 and the data structure 140 includes a first category 141 and first actions 142 that are programmatically linked to the first category 141. The first actions 142 may be instructing an autonomous or automated vehicle 156 to find the selected product, instructing an employee to find the selected product, or adjusting the PI value 122 of the selected product. In aspects, the PI value 122 is changed to an amount of the selected product found by the employee or the autonomous vehicle. Other examples are possible. The autonomous or automated vehicle 156 may be an automated ground vehicle or aerial drone, to mention two examples.

The data structure 140 includes a second category 143 and a second action 144 programmatically linked to the second category 143. The second action includes sending instructions to a store employee to take no further action. Other examples are possible.

The data structure 140 includes a third category 145 and third actions 146 programmatically linked to the third category 145. The third actions 146 include transmitting an alert to a store employee to find another product to replace the selected product, and sending instructions to the store employee to take no further action.

The database 134 is further configured to store a recall list 182 of product numbers that relate to products under a product recall. The database 134 further stores the scans 180 that are obtained from the sensor 176 and the last PI adjustment time 124.

The control circuit 132 is coupled to the interface 130 and the database 134. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 132 may be configured (for example, by using corresponding programming stored in a memory as will be well understood by those skilled in the art) to carry out one or more of the steps, actions, and/or functions described herein.

The interface 130 is configured to receive from the retail store 102 the perpetual inventory (PI) monetary value 122 (or information from which the PI value may be calculated) from the retail store 102. The control circuit 130 is further configured to obtain a last PI change time 124 (or information from which the last PI change time can be determined) from the retail store 102. The last PI change time 124 is the last time the PI value was changed at the retail store.

The control circuit 132 is configured to retrieve the PI value 122 for the selected product from the database 134, and receive the scans 180 that have been received from the transceiver circuit 154 via the network 104 (and potentially stored in the database 134). The scans 180 may also be stored in the database 134. The control circuit 132 is further configured to determine when the selected product is out-of-stock based upon an analysis of the scans 180. When the selected product is out-of-stock and when the PI value 122 is greater than a predetermined threshold, the control circuit 132 is configured to perform one or more of the first actions 142 associated with the first category 141. The predetermined threshold can take on a range of values. In one example, the predetermined threshold is 1. The first action that is selected may depend upon actions performed with respect to the PI of the selected product at other retail stores. For example, if all (or a predetermined number) of other retail stores were performing a particular action (e.g., sending an automated vehicle to locate a product), then this action may be selected (or a greater weight attached to performing the action). A record of actions taken at all retail stores may be stored at the database 134.

In other aspects, the control circuit 132 is configured to determine a time difference between a current time (which may be obtained from a clock) and the last PI change time 124. When the time difference is less than a predetermined time period, the control circuit 132 is configured to perform the second action 144 associated with the second category 143. In aspects, the predetermined time period is 7 days. Other examples are possible. The second action that is selected may depend upon actions performed with respect to the PI of the selected product at other retail stores.

In still other aspects, the control circuit 132 is configured to, from an analysis of the scans 180, obtain an item number of the selected product and to compare the item number of the selected product to product numbers on the recall list 182. When the item number of the selected product is on the recall list 182, the control circuit 132 is configured to perform one of the third actions associated with the third category. The third action that is selected may depend upon actions performed with respect to the PI of the selected product at other retail stores.

Figure 2:
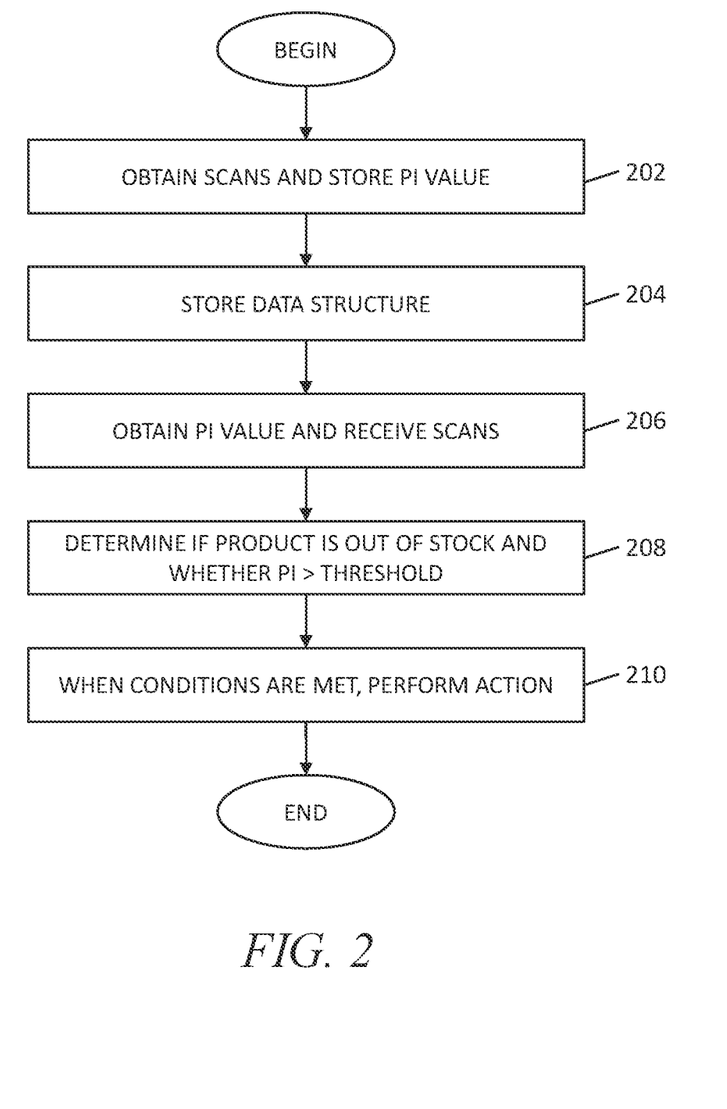
FIG. 2 is a flowchart showing one example of an approach for determining root causes for out-of-stock items and performing other actions in accordance with some embodiments.

Referring now to FIG. 2, one example of an approach for adjusting the PI value using financial considerations is described.

At step 202, scans of a selected product on shelves of a retail store are obtained and the scans are transmitted over a network via a transceiver circuit, for example, to a central processing center. A perpetual inventory (PI) value is also stored for a selected product in a database.

The scans may be obtained from any type of sensing device such as a camera (obtaining images in any wavelength of light) or an RFID scanner. The images or scans may be of any format and in one example are images of the shelves obtained in the visible light spectrum.

At step 204, a data structure is stored in the database that is disposed, for example, at the central processing center. The data structure includes a first category and first actions programmatically linked to the first category. The first actions include instructing an autonomous vehicle to find the selected product, instructing an employee to find the selected product, and adjusting the PI value of the selected product. As described elsewhere herein, other categories and actions may be included or represented in the data structure.

At step 206, the PI value for the selected product is obtained from the database. The scans are also received from the network. In examples, the database is located at a central processing center. In further aspects, the scans may be stored in this database.

At step 208, a determination is made as to when the selected product is out-of-stock based upon an analysis of the scans. The scans may be analyzed according to approaches known by those skilled in the art that determine whether a particular product is shown in the scan. For example, known image processing techniques may compare images in the scan to known images in the product to determine whether there is a match. At step 208, it is also determined whether the PI value is greater than a predetermined threshold. In examples, the predetermined threshold may be 1.

At step 210, when these conditions are met, one or more of the first actions associated with the first category are performed. In examples, the actions may include sending a message to a human or an automated vehicle to locate the product in the retail store. When an automated vehicle is used, the message may be a control signal that causes the automated vehicle (e.g., an automated ground vehicle or aerial drone) to search predetermined locations (shelves, storage areas, backrooms, to mention a few examples). The action selected may depend upon actions performed with respect to the PI of the selected product at other retail stores. For example, if all (or a predetermined number) of other retail stores were performing a particular action (e.g., sending an automated vehicle to locate a product), then this action may be selected (or a greater weight attached to performing the action).

Figure 3:
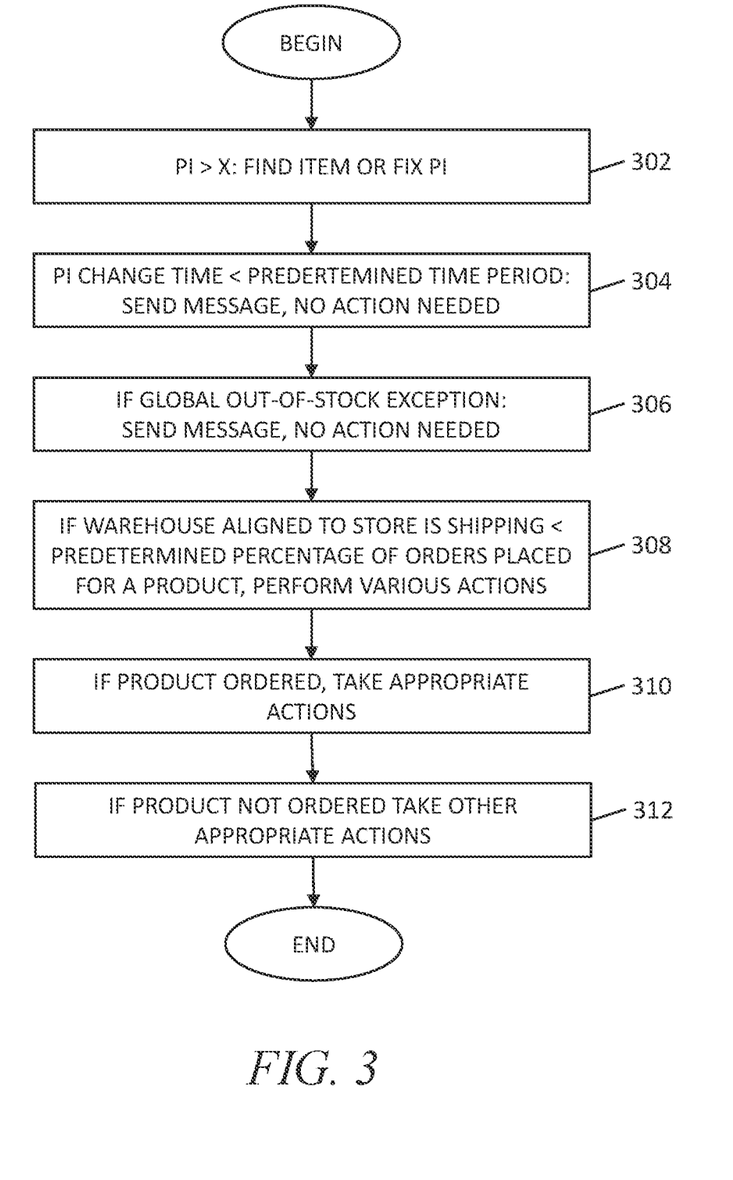
FIG. 3 is a flowchart showing another example of an approach for determining root causes for out-of-stock items and performing other actions in accordance with some embodiments.

Referring now to FIG. 3, approaches for adjusting the PI value and taking other actions to determine root causes of PI problems is described. The approaches described with respect to FIG. 3 may, in aspects, be performed at a central processing center and/or at a retail store. It will be appreciated that the steps 302-312 may be executed as if-then-else statements, and implemented in any type of programming language. That is, if the conditions at step 302 are true, the actions at step 302 are taken and execution ends. If the conditions at step 302 are not true or are not satisfied, control proceeds to step 304, where the conditions of step 304 are evaluated. If the conditions at step 304 are true, the actions at step 304 are taken and execution ends. If the conditions at step 304 are not true or are not satisfied, control proceeds to step 306, where the conditions of step 306 are evaluated. This pattern continues for all the steps.

Additionally, execution of these steps may generate a report that is rendered to a user. In examples, a written or electronic report may be generated. The report may indicate the root cause for out-of-stock issues (including incorrect PI values) and suggestions (e.g., actions) to correct these problems.

At step 302, a check is made of the PI. When the PI value is greater than a predetermined threshold (X), one or more actions may be performed. The actions include instructing an autonomous vehicle to find the selected product, instructing an employee to find the selected product, or adjusting the PI value of the selected product. Execution then halts. If the conditions of step 302 are not met, control proceeds to step 304.

At step 304, a last PI change time (or information from which the last PI change time can be determined) is obtained from the retail store. The last PI change time is the last time the PI value was changed at the retail store. A time difference between a current time (e.g., obtained from a clock) and the last PI change time is determined. When the time difference is less than a predetermined time period, various actions can be performed. For example, a message may be sent to a store employee. Execution then halts. When these conditions are not met, control proceeds to step 306.

At step 306, an item number of the selected product is obtained (from an analysis of scans of the store, for instance, scans of the shelf) and compared the item number of the selected product to product numbers on a recall list. The recall list includes a list of product numbers that relate to the products under a product recall may be stored in a database. When the item number of the selected product is on the recall list (there is a global out-of-stock exception), various actions may be performed. For example, the actions may include transmitting an alert to a store employee to find another product to replace the selected product, or sending instructions to the store employee to take no further action. Execution then halts. When these conditions are not met, control proceeds to step 308.

At step 308, it is determined if a warehouse aligned to the retail store (e.g., a warehouse supplying the retail stores with products) is shipping less than a predetermined number of all orders placed for the product. If the answer is affirmative (indicating the warehouse is not shipping enough), various actions may be performed. These actions include issuing alerts upstream alerts to have the warehouse obtain more of the product, alerting the store to prioritize inbound shipments, alerting the store to take some temporary stocking action, re-routing products to the store from another warehouse, fining the supplier for an in-stock violation, or billing the supplier an additional freight factor. Execution then halts. When these conditions are not met, control proceeds to step 310.

At step 310, it is determined if the product has been ordered by the store. If the answer is affirmative, forecasts (e.g., showing the lead time to obtain the product) may be updated, and inbound shipments may be prioritized. Execution then halts. When these conditions are not met, control proceeds to step 312.

At step 312, it is determined if the product has not been ordered. If the answer is affirmative, actions can be taken such as dynamically re-routing some of the products from shipments going to other stores. The product may also be re-ordered. Execution then halts.

Figure 4:
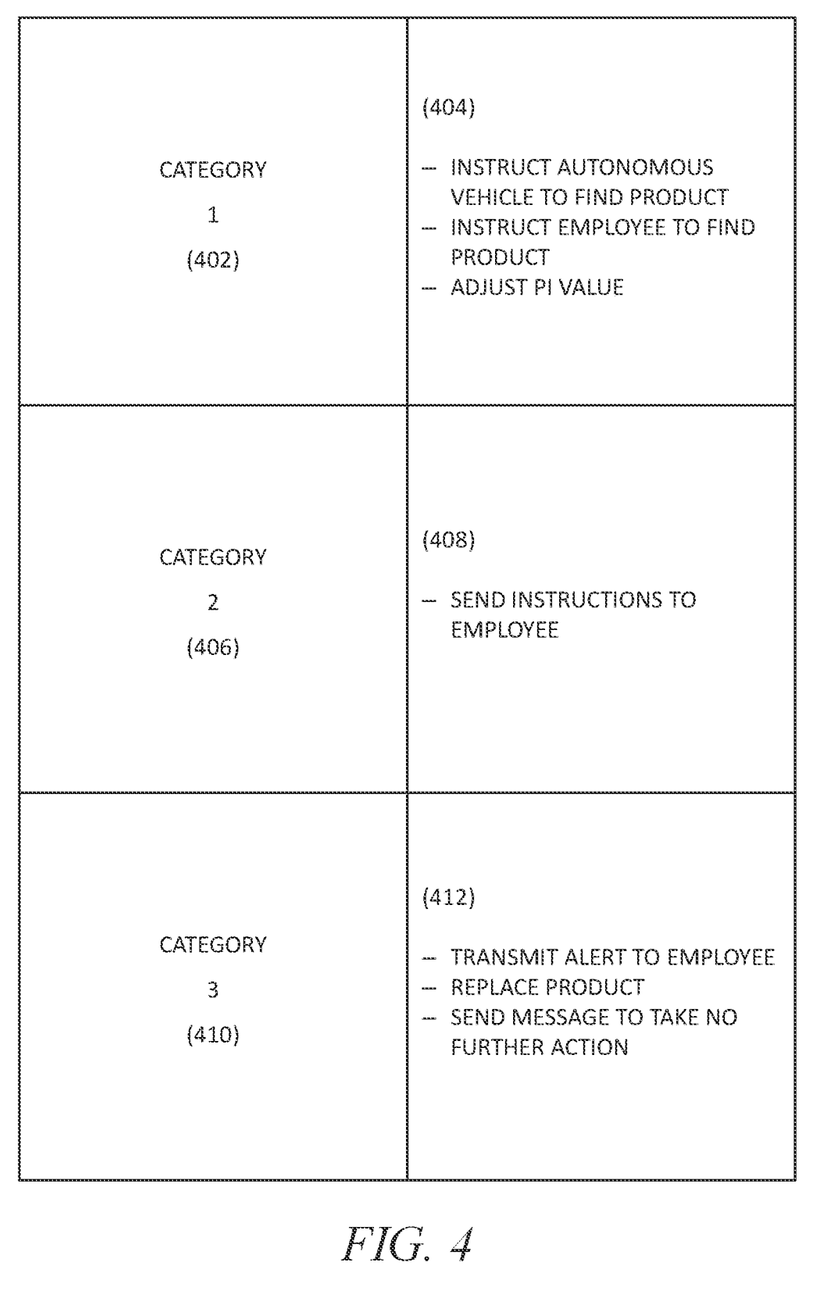
FIG. 4 is a block diagram of a data structure used for determining root causes for out-of-stock items and performing other actions in accordance with some embodiments.

Referring now to FIG. 4, one example of a data structure 400 is described. The data structure can be used in the approaches of FIG. 1, FIG. 2, and FIG. 3. The data structure may be implemented in any type of programming language. The data structure 400 may, in aspects, be stored at a database at a central processing center.

The data structure 400 includes a first category 402 and first actions 404 that are programmatically linked to the first category 402. The data structure 400 may be a look-up table and the elements 402 and 404 associated with a row in the table. In other examples, a point points from element 402 to element 404. The first actions may be instructing an autonomous vehicle to find the selected product, instructing an employee to find the selected product, or adjusting the PI value of the selected product. The actions may be executable computer code, hyperlinks or links to executable code to mention a few examples.

The data structure 400 also includes a second category 406 and a second action 408 programmatically linked to the second category 406. The second action includes sending instructions to a store employee to take no further action.

The data structure 400 additionally includes a third category 410 and third actions 412 programmatically linked to the third category 410. The third actions 412 include transmitting an alert to a store employee to find another product to replace the selected product, and sending instructions to the store employee to take no further action.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system configured to determine and manage inventory values of out-of-stock products in a retail store, the system comprising:
   a product display unit that is disposed at a retail store;
   a sensor disposed in proximity to the product display unit at the retail store, the sensor configured to obtain scans of a selected product at the product display unit;
   a database that is configured to store a perpetual inventory (PI) value for a selected product, the database further configured to store a data structure, the data structure including a first category and first actions that are programmatically linked to the first category;

wherein the PI value of the selected product relates to the number of a selected products in the retail store and is increased as amounts of the selected product are shipped and received at the store and is decreased as amounts of the selected product are sold and removed from the store;

a control circuit coupled to the network and the database, the control circuit configured to:
retrieve the PI value for the selected product from the database;
receive the scans from the sensor;
determine when the selected product is out-of-stock based upon an analysis of the scans;
when the selected product is out-of-stock and when the PI value is greater than a predetermined threshold, adjust the PI value of the selected product and perform one or more of the first actions associated with the first category according to the data structure and according to actions performed with respect to the PI of the selected product at other retail stores;

wherein the data structure includes a second category and a second action programmatically linked to the second category; and wherein the control circuit is further configured to:
obtain a last PI change time from the retail store, the last PI change time being the last time the PI value was changed at the retail store;
determine a time difference between a current time obtained from a clock and the last PI change time, the time difference being in time units; and
when the time difference is less than a predetermined time period, perform the second action associated with the second category.

2. The system of claim 1, wherein the predetermined value is 1.

3. The system of claim 1, wherein the PI value is changed to an amount of the selected product found by the employee or the autonomous vehicle.

4. The system of claim 1, wherein the first actions are selected from the group consisting of: instructing an autonomous vehicle to find the selected product and instructing an employee to find the selected product.

5. The system of claim 1, wherein the second action is instructing a store employee to take no further action.

6. The system of claim 1, wherein the predetermined time period is 7 days.

7. The system of claim 1, wherein the data structure includes a third category and third actions programmatically linked to the third category, the third actions being selected from the group consisting of: transmitting an alert to a store employee to find another product to replace the selected product, and sending instructions to the store employee to take no further action, and wherein the database is further configured to store a recall list of product numbers that relate to products under a product recall;
wherein the control circuit is further configured to:
from the scans, obtain an item number of the selected product;
compare the item number of the selected product to product numbers on the recall list;
when the item number of the selected product is on the recall list, perform one of the third actions associated with the third category.

8. The system of claim 1, wherein the control circuit is configured to convert the data structure into a report.

9. The system of claim 8, wherein the control circuit renders the report to a store employee.

10. A method for determining and managing inventory values of out-of-stock products in a retail store, the method comprising:
obtaining scans of a selected product at a product display unit of a retail store and transmitting the scans over a network;
storing a perpetual inventory (PI) value for a selected product in a database;
wherein the PI value of the selected product relates to the number of a selected products in the retail store and is increased as amounts of the selected product are shipped and received at the store and is decreased as amounts of the selected product are sold and removed from the store;
storing a data structure in the database, the data structure including a first category and first actions programmatically linked to the first category;
retrieving the PI value for the selected product from the database;
receiving the scans from the network and determining when the selected product is out-of-stock based upon an analysis of the scans;
when the selected product is out-of-stock and when the PI value is greater than a predetermined threshold, adjusting the PI value of the selected product and performing one or more of the first actions associated with the first category and according to actions performed with respect to the PI of the selected product at other retail stores;
wherein the data structure includes a second category and a second action programmatically linked to the second category;
wherein the method further comprises:
obtaining a last PI change time from the retail store, the last PI change time being the last time the PI value was changed at the retail store;
determining a time difference between a current time obtained from a clock and the last PI change time, the time difference being in time units;
when the time difference is less than a predetermined time period, performing the second action associated with the second category.

11. The method of claim 10, wherein the predetermined value is 1.

12. The method of claim 10, wherein the PI value is changed to an amount of the selected product found by the employee or the autonomous vehicle.

13. The method of claim 10, wherein the first actions are selected from the group consisting of: instructing an autonomous vehicle to find the selected product and instructing an employee to find the selected product.

14. The method of claim 10, wherein the second action is instructing a store employee to take no further action.

15. The method of claim 10, wherein the predetermined time period is 7 days.

16. The method of claim 10,
wherein the data structure includes a third category and third actions programmatically linked to the third category, the third actions being selected from the group consisting of: transmitting an alert to a store employee to find another product to replace the selected product, and instructing the store employee to take no further action, the database being further configured to store a recall list of product numbers that relate to products under product recall, and
wherein the method further comprises: obtaining an item number of the selected product based upon the scans, comparing the item number of the selected product to product numbers on the recall list, and when the item number of the selected product is on the recall list, performing one of the third actions associated with the third category.

17. The method of claim 9, further comprising converting the data structure into a report.

18. The method of claim 17, further comprising rendering the report to a store employee.

\* \* \* \* \*

UNITED STATES PATENT AND TRADEMARK OFFICE
CERTIFICATE OF CORRECTION

PATENT NO. : 11,501,251 B2
APPLICATION NO. : 17/245277
DATED : November 15, 2022
INVENTOR(S) : Greg A. Bryan et al.

It is certified that error appears in the above-identified patent and that said Letters Patent is hereby corrected as shown below:

In the Claims

Column 11, Claim 17, Line 6, delete "claim 9," and insert -- claim 10, --, therefor.

Signed and Sealed this
Twenty-first Day of March, 2023

Katherine Kelly Vidal
*Director of the United States Patent and Trademark Office*